United States Patent [19]

Tada et al.

[11] Patent Number: 5,458,458
[45] Date of Patent: Oct. 17, 1995

[54] METHOD FOR GENERATING A PULSATING AIR AND AN APPARATUS TO EXECUTE THE METHOD

[75] Inventors: Hiroshi Tada; Yoshitaka Koishi; Kazue Murata, all of Hirakata, Japan

[73] Assignee: Kabushikikaisha Matsui Seisakusho, Osaka, Japan

[21] Appl. No.: 234,858

[22] Filed: Apr. 28, 1994

[30] Foreign Application Priority Data

Apr. 30, 1993 [JP] Japan .................................. 5-104028

[51] Int. Cl.⁶ .................................................. F01D 17/18
[52] U.S. Cl. .......................................... 415/150; 415/151
[58] Field of Search ............................ 415/182.1, 150, 415/151

[56] References Cited

U.S. PATENT DOCUMENTS 4,050,846  9/1977  Metzinger et al. .................. 415/182.1
5,269,648  12/1993  Freuschle ............................. 415/151

*Primary Examiner*—John T. Kwon
*Attorney, Agent, or Firm*—Koda and Androlia

[57] ABSTRACT

A method and an apparatus for generating a pulsating air by communicating an air passage intermittently by rotating a valve while feeding air into a casing or discharging air from the casing by a blower connected to a connecting port of the casing. The air passage extends from the connecting port for the blower to a transmitting port of the casing for transmitting a pulsating air. The apparatus for generating a pulsating air is comprised of a casing provided with a connecting port for a blower and a transmitting port for a pulsating air. The connecting port for the blower is connected with a feeding side of the blower or a suction side of the blower. The valve is designed to be operated so as to intermittently communicate the air passage.

8 Claims, 18 Drawing Sheets

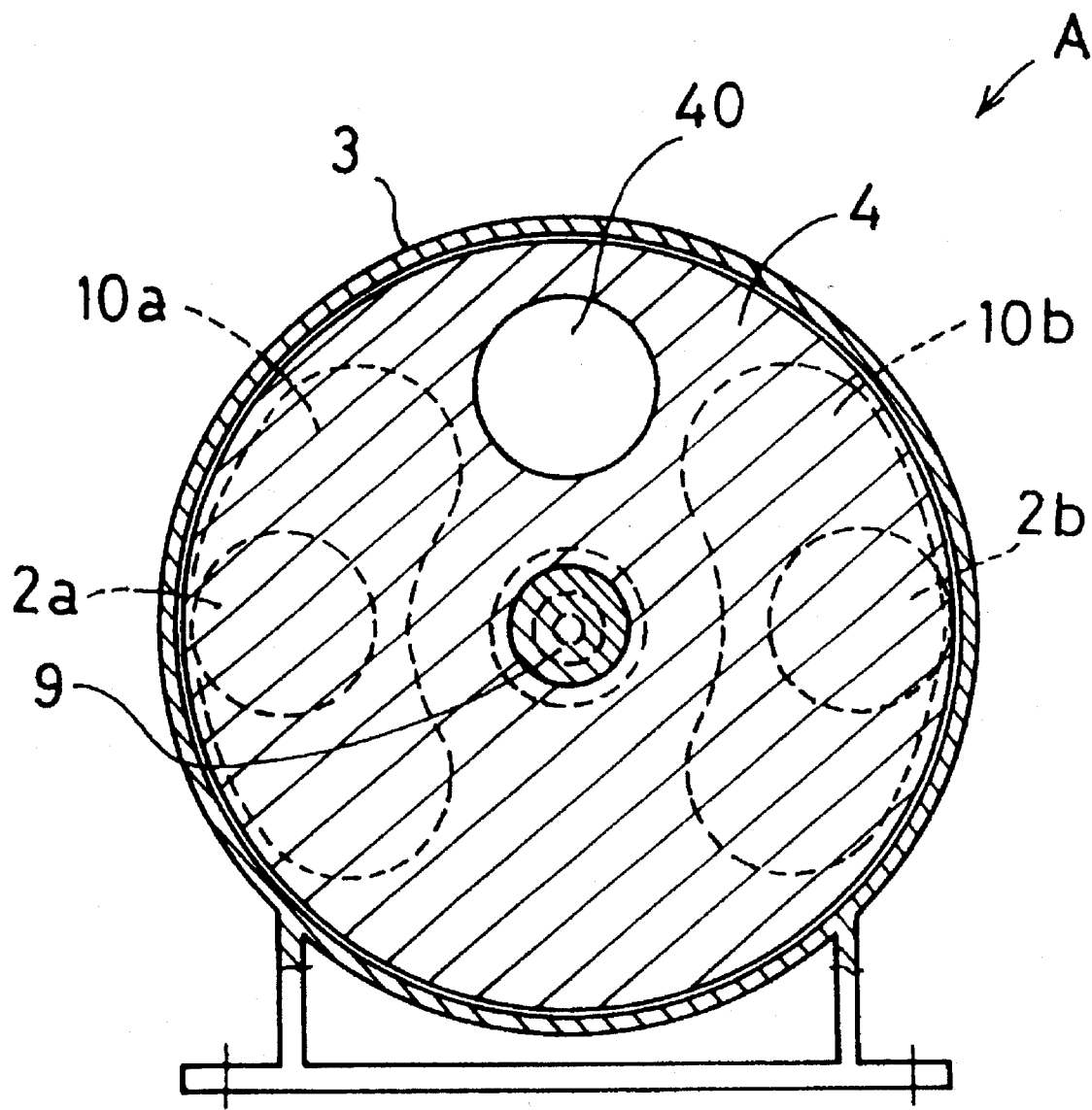
F I G. 4

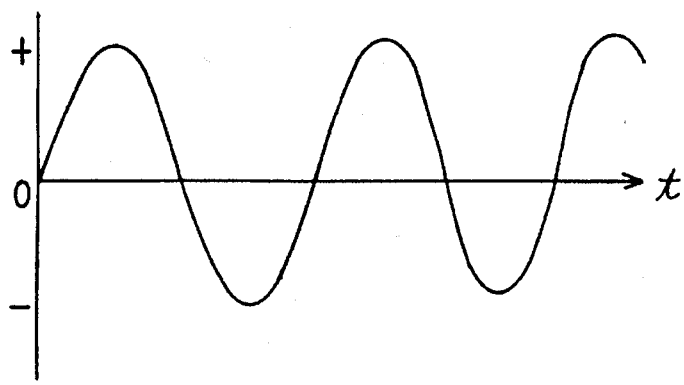
F I G. 6(a)
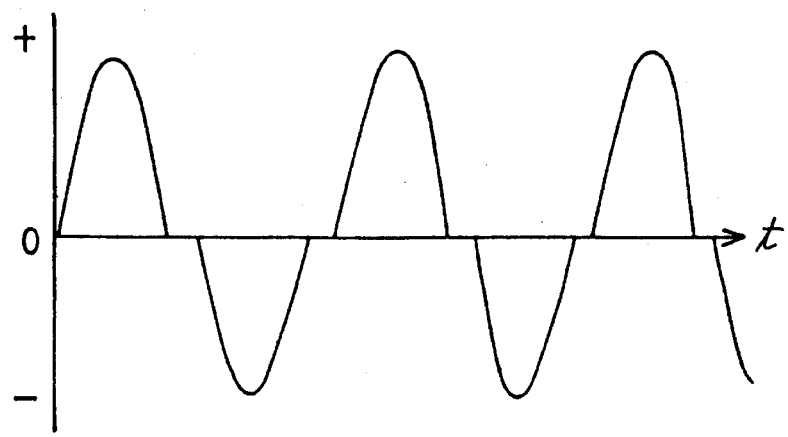
F I G. 6(b)

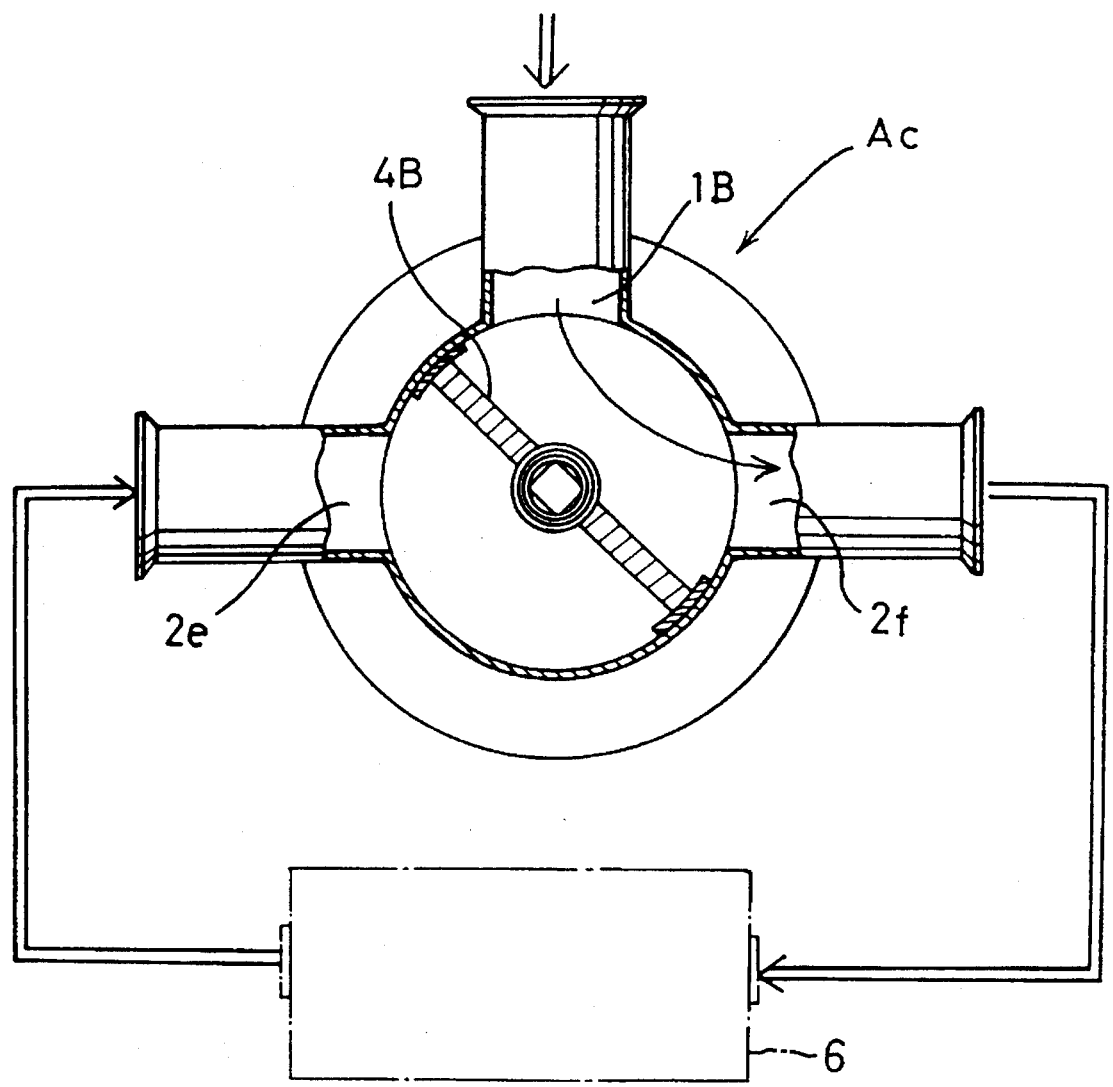
F I G. 1 7

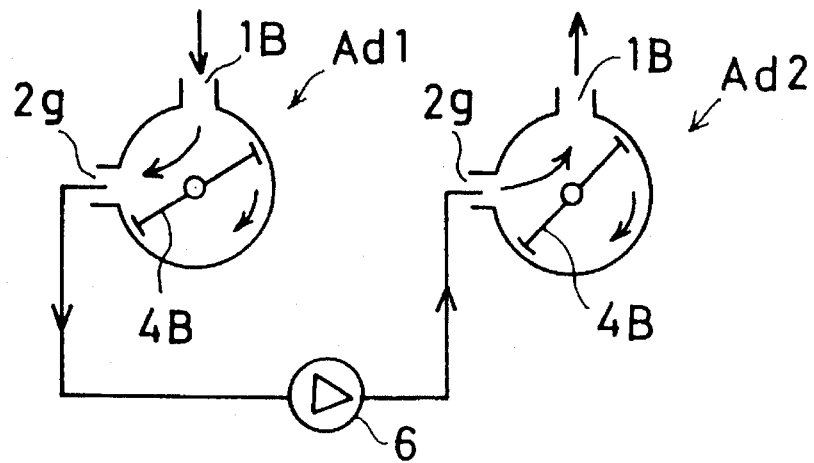
F I G. 20
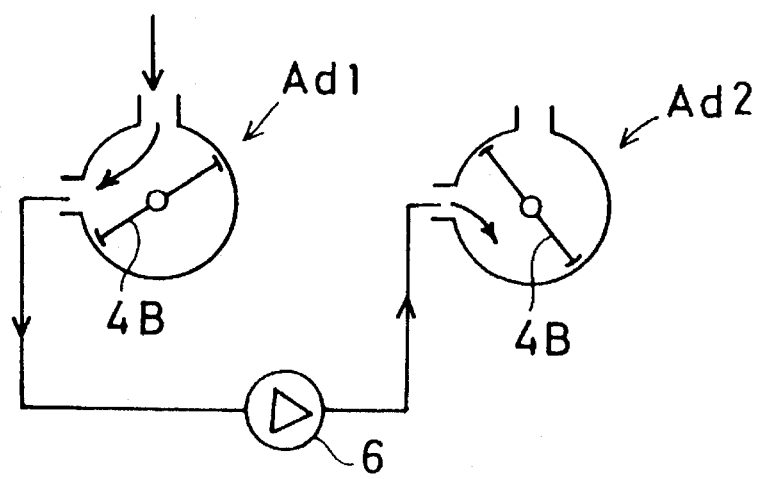
F I G. 21

METHOD FOR GENERATING A PULSATING AIR AND AN APPARATUS TO EXECUTE THE METHOD

BACKGROUND OF THE INVENTION

I. Field of the Invention

The present invention relates to a preferable method for generating a pulsating air in which a pulsating air of middle or low frequency is generated and relates to a pulsating air generation apparatus to be employed for the method.

II. Prior Art

Middle or low frequency pulsating air increases the efficiency of heating and drying treatment of powdered or granular materials when operated on the materials while they are heated or dried. Besides that, a pulsating air can be applied to remove dust and so on mixed with powdered or granular materials or to remove dust and so on attached on the surface of articles and machines, a pulsating air being expected to be utilized in various fields in future.

A speaker type pulsating air generator which generates air oscillation by electrically vibrating a cone and a diaphragm type generator which produces air oscillation by reciprocating a diaphragm of a desired figure by utilizing the spring power or the electro-magnetic power of a solenoid have been proposed.

However, the oscillating pressure of a pulsating air produced by such a speaker type or a diaphragm type generator has been very low because the cone has been merely vibrated or the diaphragm has been merely reciprocated. It has been actually difficult to utilize a pulsating air of such a low pressure for various fields of industry due to that the pulsating air doesn't work effectively when utilized to remove dust attached on articles.

A diaphragm can be enlarged, for example, to heighten the oscillating pressure of a pulsating air. However, there has been a definite limit to heighten the oscillating pressure and sufficient pressure can't be obtained when the air oscillation is generated by the movement of the diaphragm. Further the whole apparatus becomes too large to handle easily when a large diaphragm is used. Still further, mechanical vibration and noise of the whole apparatus caused by reciprocation of an enlarged diaphragm become large. Therefore, enlarging a diaphragm has such an inconvenience and can't solve the above-mentioned problems appropriately.

SUMMARY OF THE INVENTION

The present invention has been proposed in view of the above-mentioned problems. Accordingly, the object of the present invention is to generate a pulsating air of high oscillation pressure by a facile and compact apparatus.

In this specification, one of most typical pulsating air is a stationary wave of middle or low frequency.

According to a method for generating a pulsating air of the present invention, an air passage which extends from a connecting port for a blower to a transmitting port for a pulsating air is intermittently communicated by rotating a valve while air is sucked into a casing or discharged from the casing by the blower connected to the connecting port of the casing, and a pulsating air is generated from the transmitting port of the casing.

The pulsating air which is generated by the method is one of the followings, a pulsating air comprising positive wave and negative wave, a pulsating air comprising negative pressure, or a pulsating air comprising positive wave.

According to the present invention for generating a pulsating air proposed to execute the method is comprised of a casing provided with a connecting port for a blower and a transmitting port for a pulsating air and the connecting port for the blower is connected with a feeding side of the blower or a suction side of the blower. The apparatus is further comprised of a valve for closing up an air passage extending from the connecting port for the blower to the transmitting port for a pulsating air in the casing. The valve is designed so as to intermittently communicate the air passage when rotated.

According to an axial-flow type apparatus for generating a pulsating air, a valve is disk type and a transmitting port for a pulsating air and a connecting port for a blower are provided at walls of a casing. Each wall faces a front and a back of the valve disk which is designed so as to be rotated freely in the casing by the rotation of a rotating axis. The valve disk is provided at a position facing the transmitting port and the connecting port in such a way that the front or the back of the valve disk can shut off at least one of the transmitting port and the connecting port. Further, the valve disk is provided with holes for communication and the transmitting port or the connecting port are intermittently opened via the holes when the valve disk is rotated.

According to another axial flow-type apparatus for generating a pulsating air, a transmitting port for a pulsating air is provided at either a front wall or a back wall of a casing and plural connecting ports for a blower are provided at the other side of the casing wall so as to be opened or closed alternately by the valve disk. Each of plural connecting ports is connected with a feeding side and a suction side of the blower.

According to a rotary type apparatus for generating a pulsating air, a valve is plate type and the valve plate is provided so as to be rotated freely in a casing by the rotation of a rotating axis, keeping an inside of the casing divided into plural spaces. A transmitting port for a pulsating air and a connecting port for a blower are provided at an outer wall of the casing, the outer wall facing outer sides of the valve plate. The transmitting port and the connecting port are shut off and communicated alternately by the valve plate when the valve plate rotates.

According to another rotary-type apparatus for generating a pulsating air, plural connecting ports for a blower are provided at an outer wall of a casing and the connecting ports are connected with each of a feeding side and a suction side of the blower. The plural connecting ports are alternately communicated with a transmitting port for a pulsating air. When one of the plural connecting ports is communicated with the transmitting port, the other connecting port is shut off from the transmitting port by the valve.

In the above-mentioned apparatus for generating a pulsating air, the valve may be provided so as to be stopped and kept at a position where the transmitting port for a pulsating air and the connecting port for the blower are communicated each other so that air can be discharged or sucked continuously from the transmitting port for a pulsating air.

Next, operations of the present invention are described.

According to a method for generating a pulsating air, an air passage extending from a connecting port for a blower to a transmitting port of a casing for transmitting a pulsating air is communicated intermittently by the rotation of a valve while air is fed into the casing or discharged from the casing by a blower connected to the connecting port of the casing, thereby a pulsating air being generated. According to such a theory of generating a pulsating air, the oscillation pressure of the pulsating air generated from the transmitting port can be easily made high by heightening air pressure supplied into the casing from the blower or suction pressure sucked into the blower from the casing. Therefore, a pulsating air with high oscillating pressure can be obtained without enlarging a casing and other parts. Further, large mechanical vibration and noise aren't generated at parts and members such as a casing when a pulsating air is generated because parts like a large diaphragm which mechanically vibrates are unnecessary.

In an apparatus for generating a pulsating air according to the present invention, a connecting port for a blower provided for a casing is connected with a feeding side of the blower or a suction side of the blower and air is supplied into or discharged from the casing. A valve intermittently closes up or communicates an air passage extending from the connecting port to the transmitting port. Therefore, air at a fixed pressure is intermittently discharged or air at a fixed negative pressure is sucked intermittently from the transmitting port. Consequently, a method for generating a pulsating air is appropriately executed and a pulsating air is generated form the transmitting port.

According to an axial-flow type apparatus for generating a pulsating air, a disk-type valve is constructed so as to be rotated in a casing. When a front and back of the valve disk faces a transmitting port for a pulsating air and a connecting port for a blower respectively, each port is closed up. When those ports face holes of the valve disk, those ports are opened. In such a way, each port is opened and closed alternately. An air passage between the transmitting port and the connecting port is intermittently communicated and closed. Therefore, air at a fixed pressure is intermittently discharged from the transmitting port or air suction at a fixed negative pressure is intermittently executed from the transmitting port, whereby a pulsating air being generated. According to such a construction, timing period in which the transmitting port and the connecting port are communicated and closed can be modified by changing position, shape and size of openings of the transmitting port and the connecting port which are closed by the valve disk, or by changing shape and size of the holes of the valve disk. The wave shape of a pulsating air can be modified into a desired one by changing such shape and size as mentioned above.

Further according to such constructed apparatus, the period when the transmitting port and the connecting port are communicated or closed each other depends on the rotating speed of the valve disk. Therefore, the frequency of a pulsating air generated from the transmitting port can be settled easily and freely by changing the rotating speed of the valve disk. The apparatus is an axial-flow type and is constructed such that the transmitting port and the connecting port are provided at the walls of the casing which faces the front and the back of the valve disk. Therefore, when piping is done for these ports, it can be avoided that the piping projects out of the outer circumference of the casing. The valve disk is designed so as to be rotated in the casing, but the rotation of the valve disk doesn't cause such large mechanical vibration that is apt to be caused by reciprocating a fixed member, restraining vibration of the apparatus.

According to an axial-flow type apparatus for generating a pulsating air, plural connecting ports which are connected to a feeding side and a suction side of a blower are opened and closed by a valve disk alternately. Discharge of air in a casing and suction of outer air into the casing are executed alternately through the transmitting port for a pulsating air. A pulsating air with large amplitude in which pressurizing and depressurizing are repeated alternately can be obtained at the transmitting port for a pulsating air. The pulsating air is different from the one which is generated by only discharging air or by only sucking air.

According to a rotary-type apparatus for generating a pulsating air, a plate-type valve is rotated with the inside of a casing divided into plural spaces. A transmitting port for a pulsating air and a connecting port for a blower which are provided around the outer wall of the casing are closed and communicated alternately. Then discharge or suction of air at a fixed pressure is intermittently executed from the transmitting port and a pulsating air is generated. According to such a construction, the wave shape of a pulsating air can be modified into a desired one by changing shape and size and so on of the transmitting port or the connecting port like the above-mentioned axial-flow type generator with one connecting port. Further, the frequency of a pulsating air can be settled easily and freely by changing the rotation speed of the valve plate. Moreover, mechanical vibration of the apparatus can be considerably restrained because the valve plate is rotated.

According to a rotary-type apparatus for generating a pulsating air, each of plural connecting ports which are connected with a feeding side and a suction side of a blower is closed up and communicated with a transmitting port alternately by the rotation of a valve plate. Discharge and suction of air are executed alternately at the transmitting port. A pulsating air with large amplitude in which pressurizing and depressurizing are repeated alternately can be obtained at the transmitting port.

According to an apparatus for generating a pulsating air, a valve is designed to be stopped at the position where a transmitting port and a connecting port are communicated each other. Continuous air discharge or air suction can be executed through the transmitting port. Therefore, such apparatus can be also used for feeding air continuously or for sucking air continuously other than generating a pulsating air.

BRIEF DESCRIPTION OF THE DRAWINGS

FIG. 4 is a sectional view of the pulsating air generator showing one condition where the valve disk is rotated from the position shown in FIG. 2.

FIGS. 6(a) and (b) show the wave shape of a pulsating air generated from the pulsating air generator shown in FIG. 1.

FIG. 17 is a sectional view showing that the valve plate of the pulsating air generator of FIG. 15 is rotated.

FIG. 20 shows one example how the pulsating air generator of FIG. 19 is operated.

FIG. 21 shows another example how the pulsating air generator of FIG. 19 is operated.

DETAILED DESCRIPTION OF THE PREFERRED EMBODIMENT

Now embodiments of the present invention will be described referring to the attached drawings.

Figure 1:
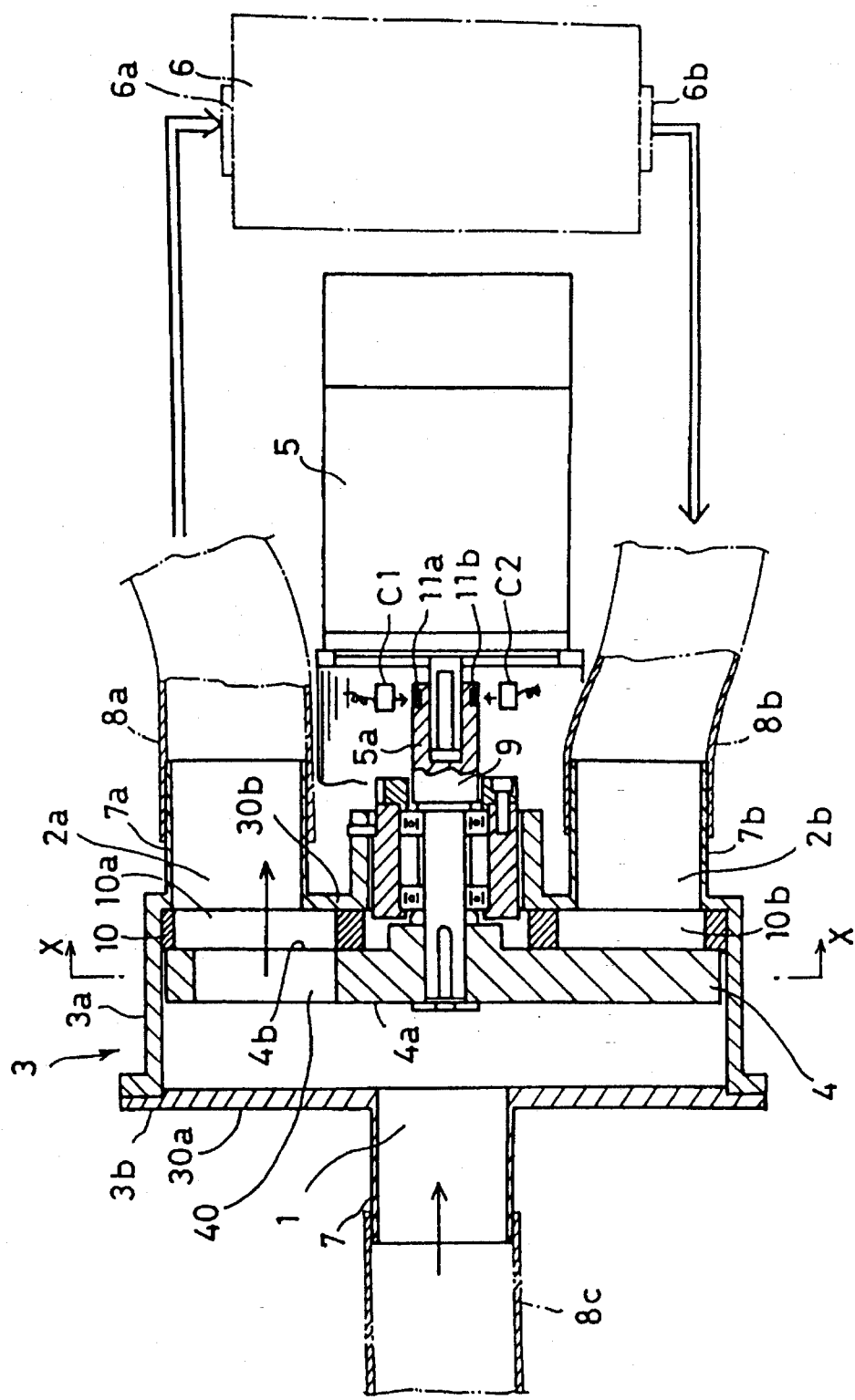
FIG. 1 is a sectional plan view of one embodiment of a pulsating air generator according to the present invention.
Figure 2:
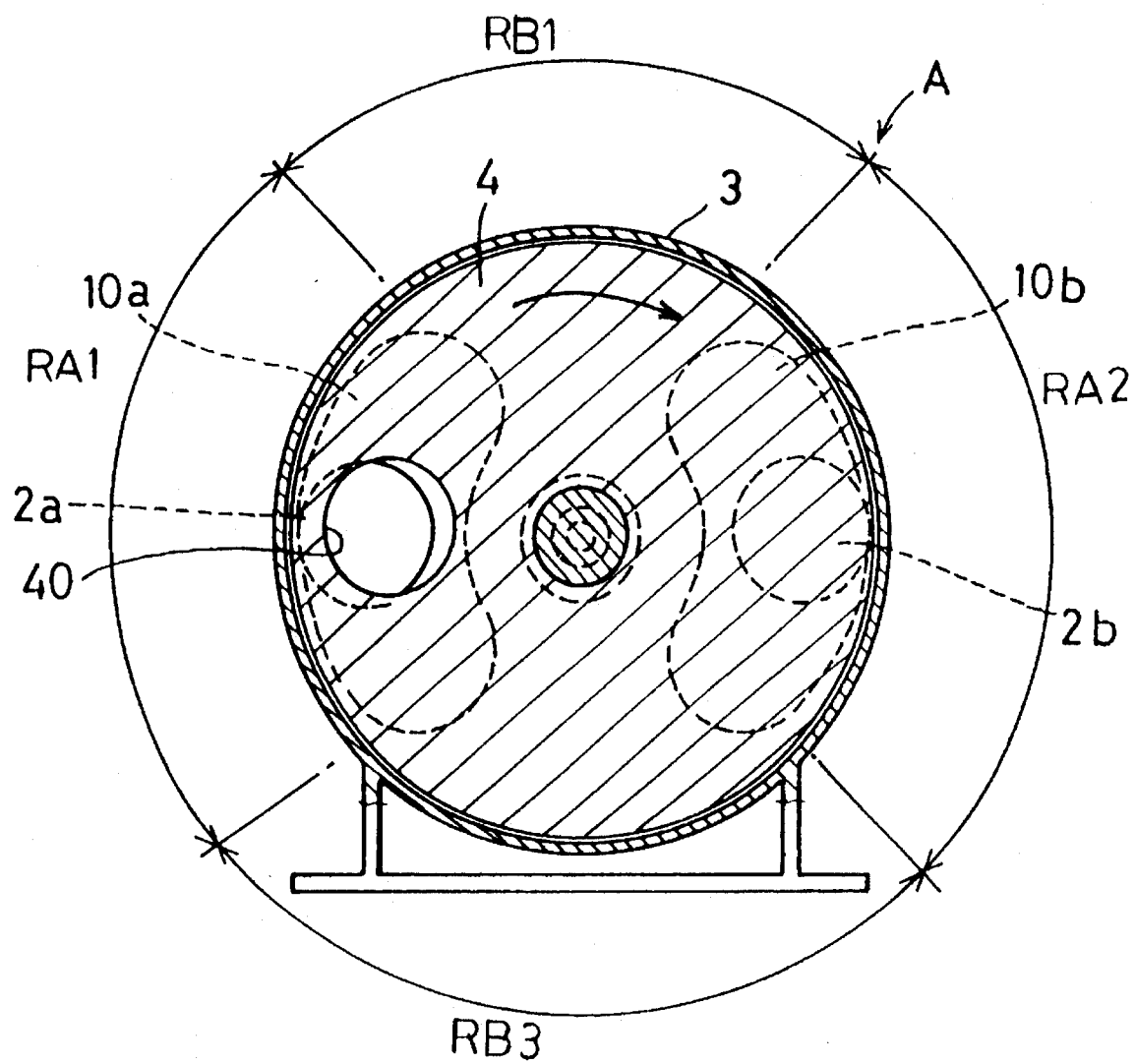
FIG. 2 is a sectional view taken along line X—X of FIG. 1.
Figure 3:
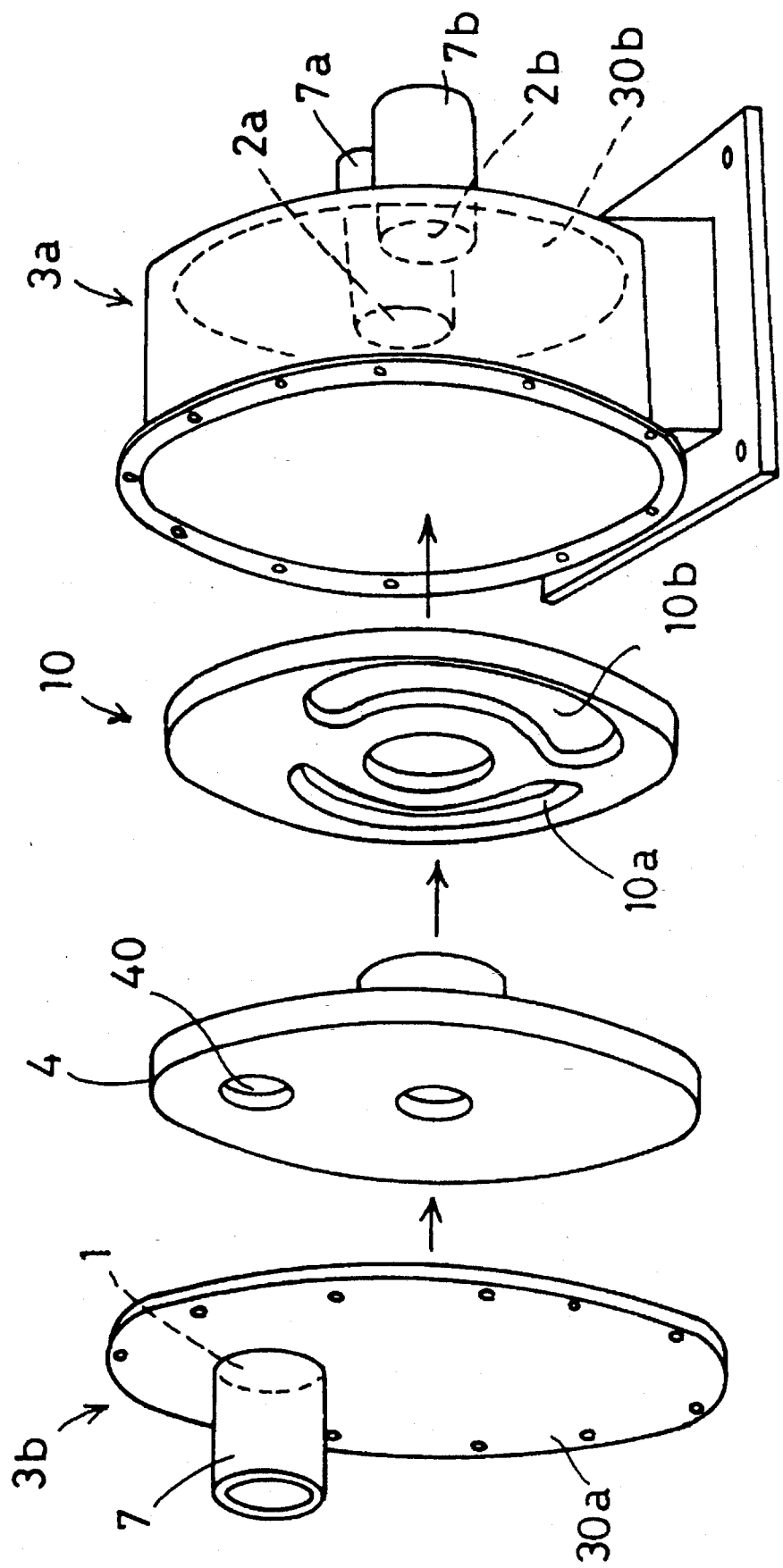
FIG. 3 is a perspective and partial exploded view of the pulsating air generator of FIG. 1.

FIG. 1 is a sectional plan view of one embodiment of a pulsating air generator A according to the present invention. FIG. 2 is a sectional view taken along line X—X of FIG. 1. FIG. 3 is a perspective and partial exploded view of the pulsating air generator A. The pulsating air generator A is provided with a casing 3 having a transmitting port 1 for a pulsating air and two ports 2a, 2b connecting with a blower 6, a valve disk 4 in the casing 3, a driving motor 5 for driving and rotating the valve disk 4, and the blower 6 for feeding air into the casing 3 and for discharging air from the casing 3. Several kinds of blowers such as Root's Blower and so on can be applied as the blower 6. In the present invention any blower which can feed air at a fixed positive pressure and suck air at a fixed negative pressure may be used. Therefore, a vacuum pump can be considered as a blower in the present invention.

The casing 3 is comprised of a main body 3a of cylindrical shape with its front side opened and a front cover 3b connected to the front side of the main body 3a with flanges. The transmitting port a pulsating air 1 is provided at an appropriate position of the front cover 3b which corresponds to a front wall 30a of the casing 3. A short tube 7 is provided at the transmitting port 1 when required and is used to connect with a pipe 8c.

Two connecting ports 2a, 2b for the blower 6 are provided at right and left sides of a back wall 30b of the casing 3 and each of them 2a, 2b has a short tube 7a, 7b respectively. The connecting ports 2a, 2b are connected with a suction port 6a and a feeding port 6b of the blower 6 via pipes 8a, 8b respectively. Air can be fed into the casing 3 and discharged from the casing 3 by this construction. The transmitting port 1 and the connecting ports 2a, 2b are provided at the walls 30a, 30b which face the front 4a and the back 4b of the valve disk 4 respectively. The pipes 8a, 8b, 8c can be neatly connected in such a way that they don't project out of the outer circumference of the casing 3.

The valve disk 4 can rotate freely in the casing 3 because it is supported by a rotating axis 9 which is connected with a driving axis 5a of the driving motor 5. A spacer 10 is interposed between the back 4b of the valve disk 4 and the back wall 30b of the casing 3. Long circular holes 10a, 10b are provided at right and left sides of the spacer 10. When each long hole 10a, 10b faces the connecting ports 2a, 2b of the casing 3, these ports are communicated. The valve disk 4 is formed circular so that the disk 4 can close both connecting ports 2a, 2b by blocking the long holes 10a, 10b of the spacer 10 at the same time. The valve disk 4 is provided with a hole 40 for communication which is circular and is formed about the same size as the connecting ports 2a, 2b for the blower. The hole 40 is communicated with respective long holes 10a, 10b of the spacer 10 when the valve disk 4 is rotated. On the other hand the hole 40 can be positioned at the place where it doesn't communicate any of the holes 10a, 10b.

Figure 5:
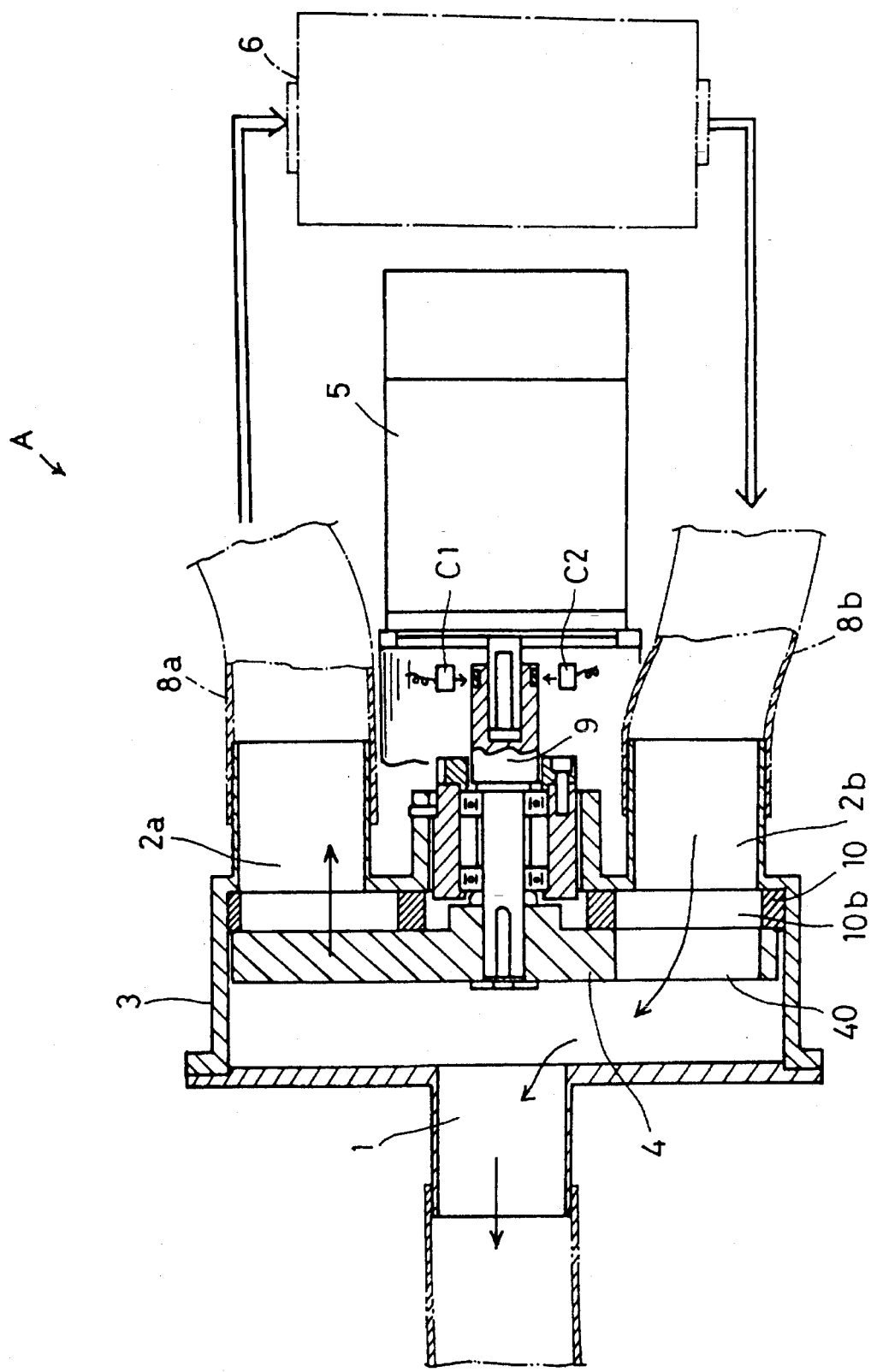
FIG. 5 is a sectional view showing the condition where the valve disk of the pulsating air generator in FIG. 1 is rotated.

One example of the driving motor 5 is a motor with a brake which can fix the valve disk 4 at a fixed angle of rotation. Preferably, the motor of which rotation speed can be changed by inverter control and so on is applied. Sensors C1, C2 are provided so as to be faced or in proximity to outer ends of the rotating axis 9 as means for controlling the driving motor 5. The sensors C1, C2 are designed to detect the position where the hole 40 of the valve disk 4 faces the connecting port 2a as shown in FIG. 1 and the position where the hole 40 faces the other connecting port 2b as shown in FIG. 5. The motor 5 can stop and keep the axis 9 and the valve disk 4 under the condition where the sensors C1, C2 detect such positions. One embodiment of the sensors C1, C2 is a photoelectric type which detects reflecting surfaces 11a, 11b provided on the axis 9. However, a proximity switch or a limit switch which detects by a mechanical contact can be used as the sensors C1, C2.

Next, one preferable method for generating a pulsating air in which the above-mentioned pulsating air generator A is applied according to the present invention and its operations are described hereunder.

The valve disk 4 is rotated in a fixed direction while the blower 6 connected to the casing 3 is operated. The hole 40 of the valve disk 4 is also revolved around the axis 9 and its position changes accompanied with the rotation of the valve disk 4.

When the hole 40 of the valve disk 4 faces the long hole 10a of the spacer 10, the connecting port 2a for the blower 6 is communicated with the inside of the casing 3 as shown in FIG. 1, air in the casing 3 being sucked by the blower 6. On the other hand, the connecting port 2b is closed by the valve disk 4. Therefore, negative pressure which sucks open air from the transmitting port 1 is generated in FIG. 1. The duration when negative pressure is generated is the period when the hole 40 of the valve disk 4 is located within a range RA1 as shown in FIG. 2.

Then the hole 40 of the valve disk 4 is located where the hole 40 faces neither of the long holes 10a, 10b of the spacer 10 when the valve disk 4 is further rotated, as shown in FIG. 4. In such a condition, both connecting ports 2a, 2b are blocked by the valve disk 4 and air isn't discharged from or sucked into the casing 3. At this time, generation of negative pressure from the transmitting port 1 is stopped. Such a condition is kept while the hole 40 of the valve disk 4 is located in an area RB1 as shown in FIG. 2.

Then the hole 40 of the valve disk 4 moves into a position where the hole 40 communicates with the connecting port 2b via the long hole 10b of the spacer 10, as shown in FIG. 5. In this case air with a fixed pressure is supplied into the casing 3 from the blower 6. Accordingly, air with a fixed pressure is discharged from the transmitting port 1. The duration of discharge is the period when the hole 40 of the valve disk 4 is located within an area RA2, as shown in FIG. 2. When the hole 40 is located within an area RB2, discharge of air from the transmitting port 1 is stopped.

When the valve disk 4 is continuously rotated as mentioned above, a cycle comprising sucking air from the transmitting port 1 by negative pressure, stopping sucking, discharging air from the port 1 at a fixed pressure, and stopping discharging is repeated in series. Consequently, depressurizing and pressurizing are intermittently repeated at the transmitting port 1 and a pulsating air is transmitted from the port 1. In such a pulsating air, positive pressure and negative pressure are repeated alternately and its wave is formed like FIG. 6(a) or (b). Its amplitude can be made large and its oscillating pressure can become high. The oscillating pressure of a pulsating air depends on the amount of suction and discharge of the blower 6. Accordingly the oscillating pressure can be easily made high by increasing the amount of suction and discharge of the blower 6. The timing of suction and discharge through the transmitting port 1, the timing of stopping those operations and so on depend on the diameters and positions of the transmitting port 1, the connecting ports 2a, 2b and the long holes 10a, 10b of the spacer 10. Therefore, a desired pulsating air can be obtained by controlling such conditions.

According to the pulsating air generator A as mentioned above, the frequency of a pulsating air transmitted through the port 1 accords with the number of the rotation of the valve 4. The pulsating air can be easily and accurately settled at a desired frequency by controlling the number of the rotation of the driving motor 5. The valve disk 4 is a well-balanced circle and is continuously rotated in order to generate a pulsating air. Therefore, mechanical vibration and noise can't be caused in the casing 3 and other parts.

The pulsating air generator A is sometimes required to be used as a simple instrument which supplies or sucks air other than as a generator for a pulsating air. In such a case, when the sensor C1 or C2 detects the position where the hole 40 of the valve disk 4 faces the connecting port 2a or 2b to be communicated each other and the valve disk 4 is stopped and kept at the position by operating a brake of the driving motor 5. If the valve disk 4 is stopped under the condition of FIG. 1, air suction can be done continuously from the port 1. If the valve disk 4 is stopped under the condition of FIG. 5, air can be continuously supplied. Therefore, the generator A can be widely utilized.

Figure 7:
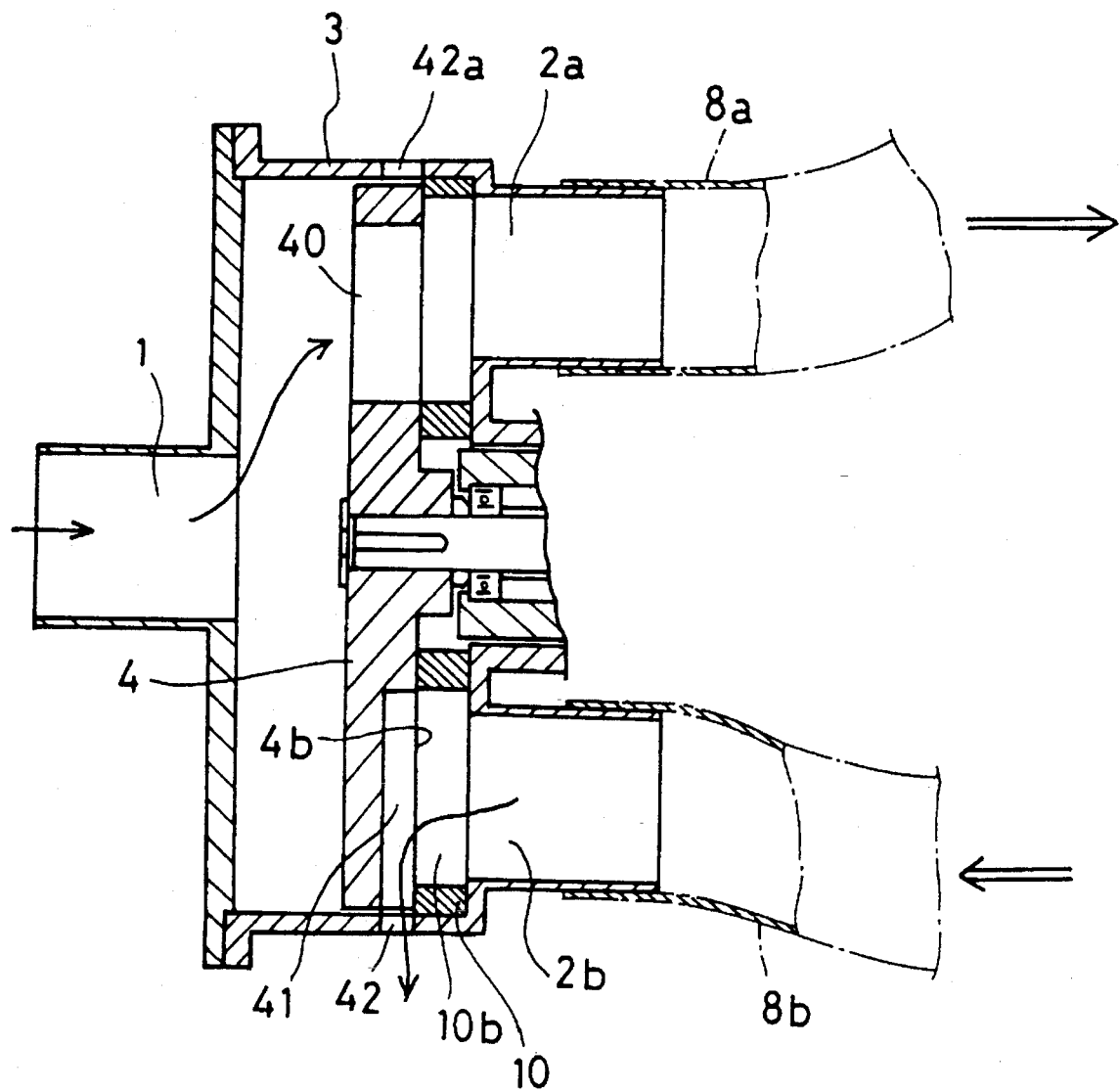
FIG. 7 is a sectional view of other embodiment of a pulsating air generator according to the present invention.

In FIG. 7, a cutout groove 41 is provided at the back 4b of the valve disk 4 of the generator A. Holes 42, 42a which is communicated with the cutout groove 41 are provided at appropriate positions of the outer wall of the casing 3. The generator in FIG. 7 is designed such that compressed air supplied into the connecting port 2b from the blower 6 is discharged out of the casing 3 via the cutout groove 41 and the hole 42 while the blower 6 discharges air in the casing 3 through the connecting port 2a. When the valve disk 4 is rotated and the cutout groove 41 faces the hole 42a, the blower 6 sucks outside air through the connecting port 2a. Suction and discharge of the blower 6 can be smoothly done when the generator A is constructed as mentioned above. If the generator A is designed such that the valve disk 4 can fully close the connecting port 2b while air in the casing 3 is discharged through the connecting port 2a as shown FIG. 1, the pressure of compressed air fed into the pipe 8b from the blower 6 can be heightened. Therefore, such construction is advantageous to heighten the oscillating pressure of a pulsating air generated at the port 1.

Figure 8:
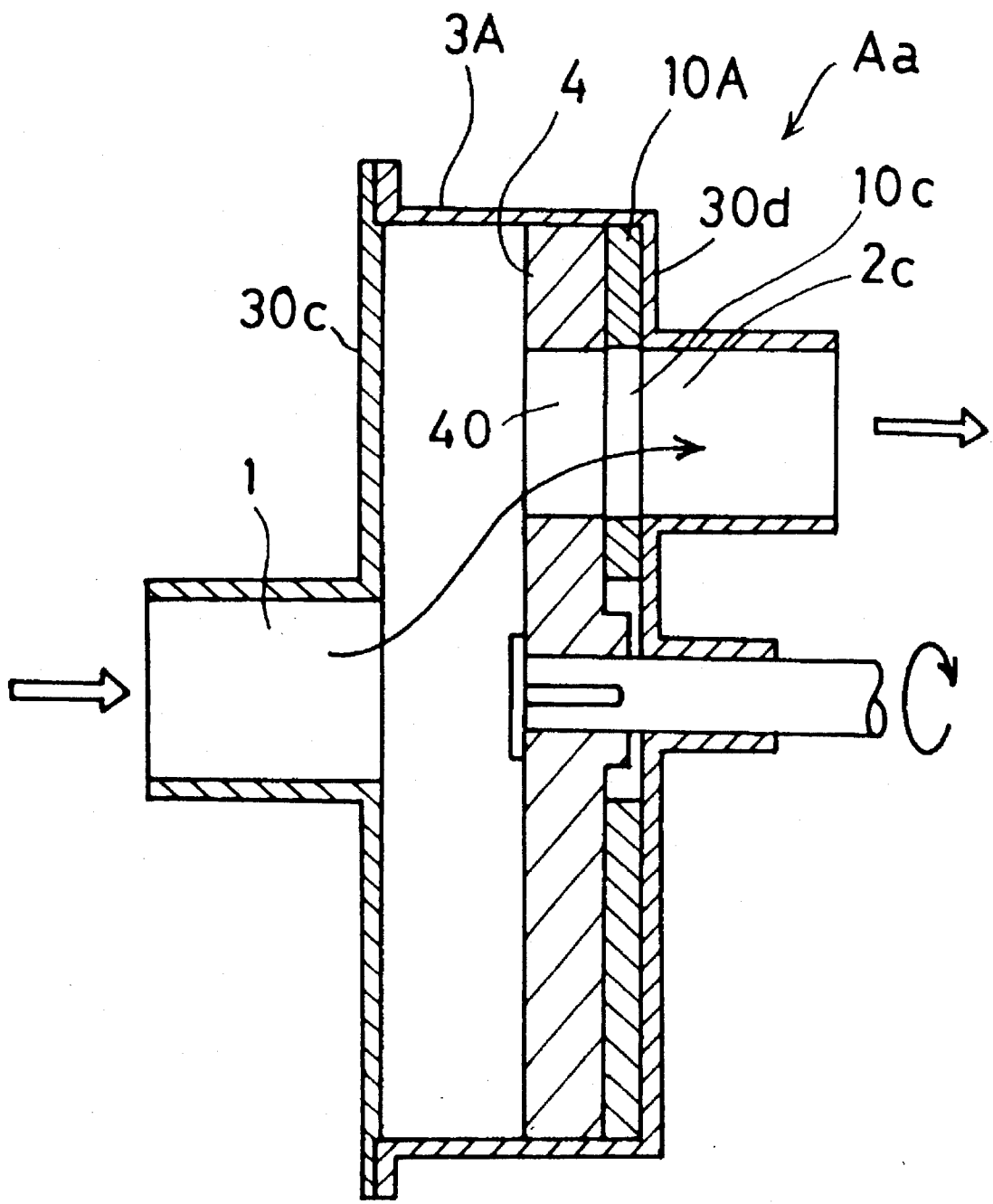
FIG. 8 is a sectional view of a further embodiment of a pulsating air generator according to the present invention.

FIG. 8 is a diagrammatic plan view of other embodiment of a pulsating air generator Aa according to the present invention.

The pulsating air generator Aa is provided with a transmitting port 1 for a pulsating air at a front wall 30c of a casing 3A and a connecting port 2c for a blower at a rear wall 30d. A valve disk 4 having a hole 40 is located so as to touch or to be in close proximity to a spacer 10A provided with a hole 10c for communicating with the connecting port 2c.

Figure 9:
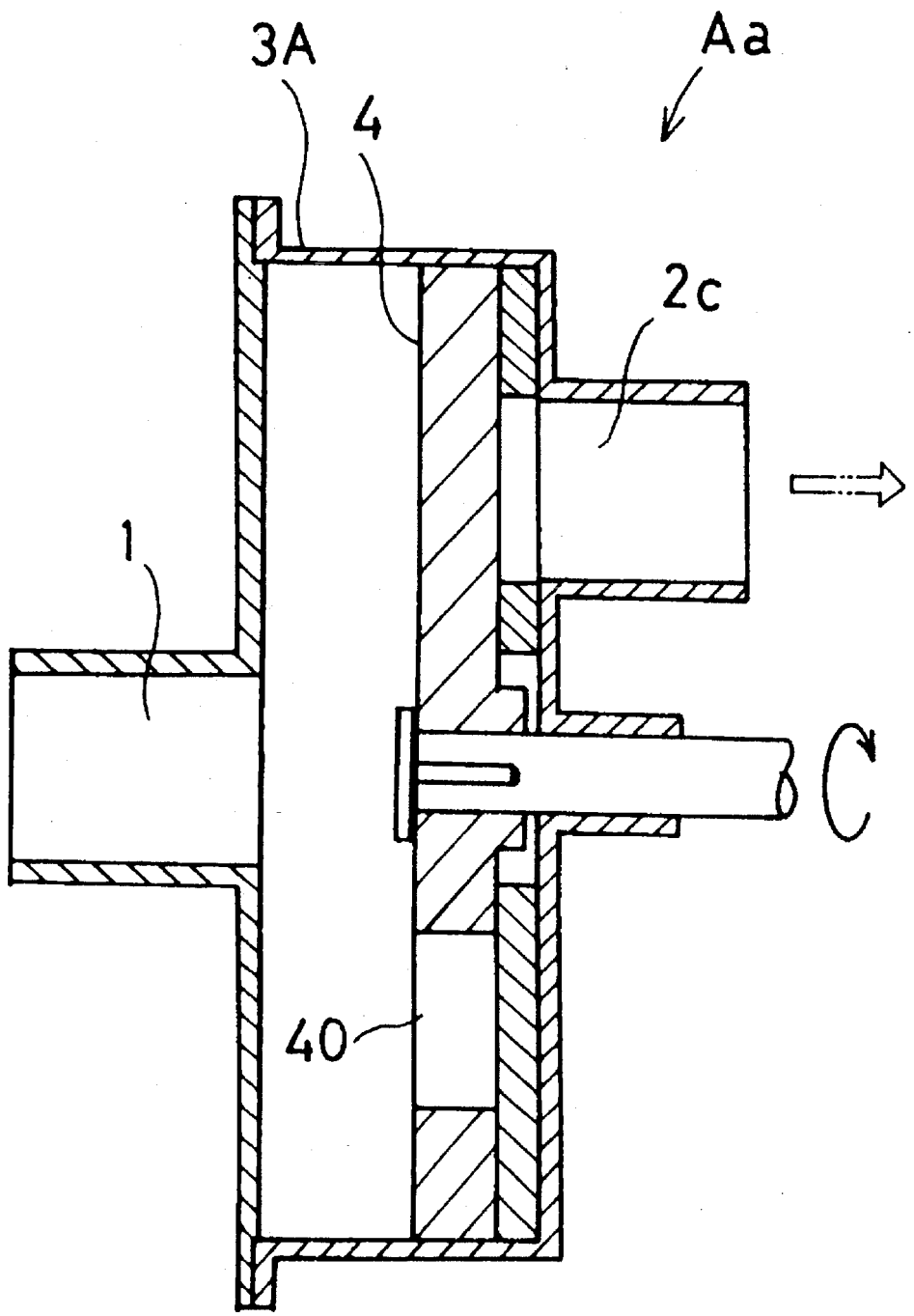
FIG. 9 is a sectional view showing the condition where the valve disk of the pulsating air generator shown in FIG. 8 is rotated.

According to the pulsating air generator Aa, when a suction side of the blower (not shown) is connected with the connecting port 2c and the valve disk 4 is rotated, for example, air in the casing 3A is sucked into the blower and negative pressure is generated at the port 1 under the condition of FIG. 8. When the valve disk 4 is further rotated and the hole 40 of the valve disk 4 is positioned at the place which doesn't meet the connecting port 2c, as showing in FIG. 9, the port 2c is blocked by the valve disk 4 and negative pressure isn't generated at the transmitting port 1. When the valve disk 4 is continuously rotated, the conditions like FIGS. 8 and 9 as mentioned above are repeated alternately. Consequently, negative pressure is intermittently generated at the transmitting port 1 and a pulsating air under negative pressure can be appropriately transmitted through the transmitting port 1.

Figure 10:
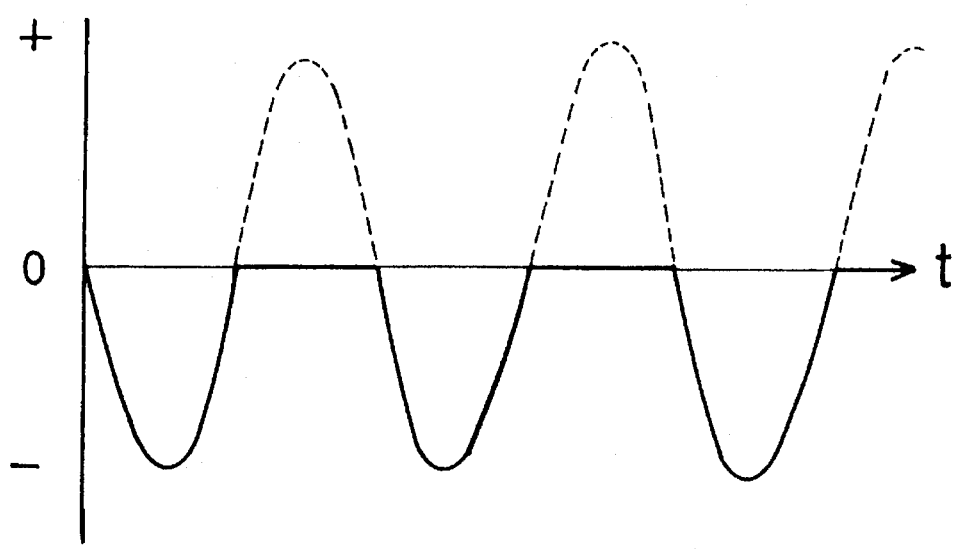
FIG. 10 shows the wave shape of a pulsating air generated from the pulsating air generator of FIG. 8.
Figure 11:
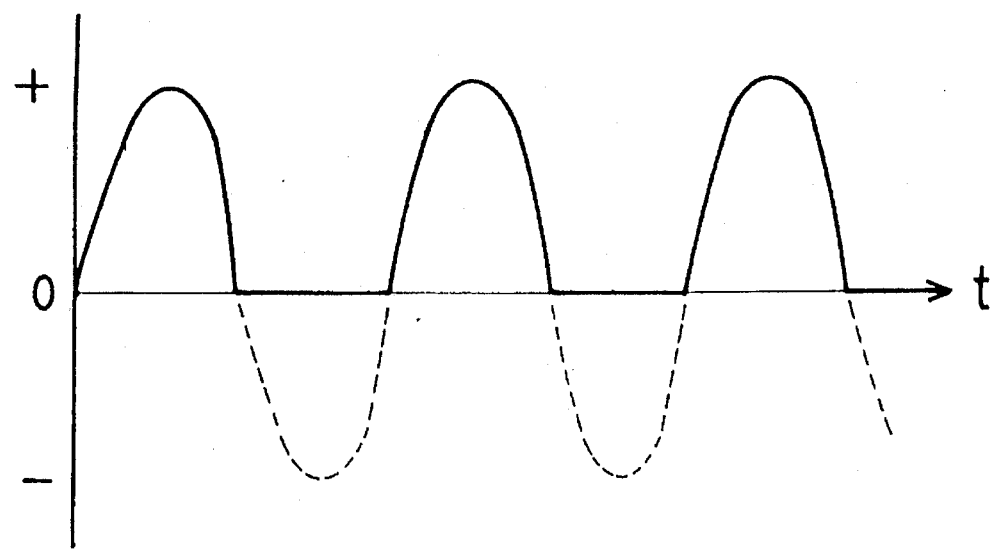
FIG. 11 shows other wave shape of a pulsating air generated from the pulsating air generator of FIG. 8.

FIG. 10 shows the shape of a pulsating air generated under the above-mentioned condition. When such a pulsating air under negative pressure is utilized for eliminating dust attached on powdered or granular materials, for example, dust is removed from the materials by the oscillation of a pulsating air and simultaneously the removed dust is sucked into the casing 8A through the transmitting port 1 and collected. Therefore, such an apparatus is very useful. On the contrary, when the connecting port 2c is connected with feeding (discharging) side of the blower, a pulsating air with positive pressure, as shown in FIG. 11, can be generated from the transmitting port 1.

Figure 12:
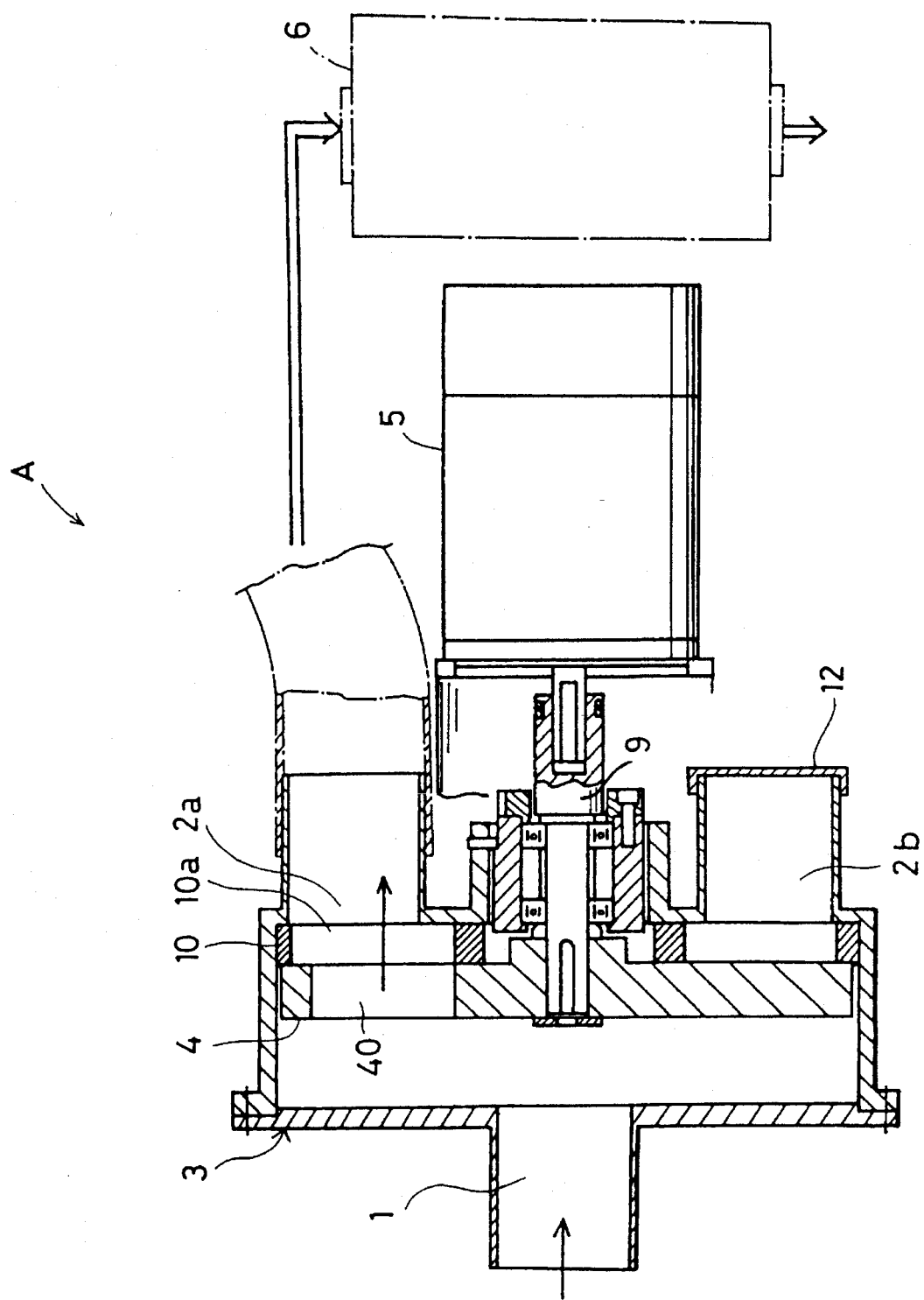
FIG. 12 is a sectional view showing other embodiment in which the pulsating air generator of FIG. 1 is employed.

FIG. 12 is a sectional view of an embodiment when a pulsating air generator A shown in FIG. 1 is used in the same manner as a generator Aa is used as shown in FIG. 8. According to the construction of FIG. 12, one port 2b of two connecting ports 2a, 2b of the pulsating air generator A is blocked with an appropriate cover 12. Practically, it is the same as a generator with one connecting port 2a. According to such a construction, a pulsating air with only negative pressure or only positive pressure can be generated from the transmitting port 1 as described in the explanations of FIG. 8 and FIG. 9.

Figure 13:
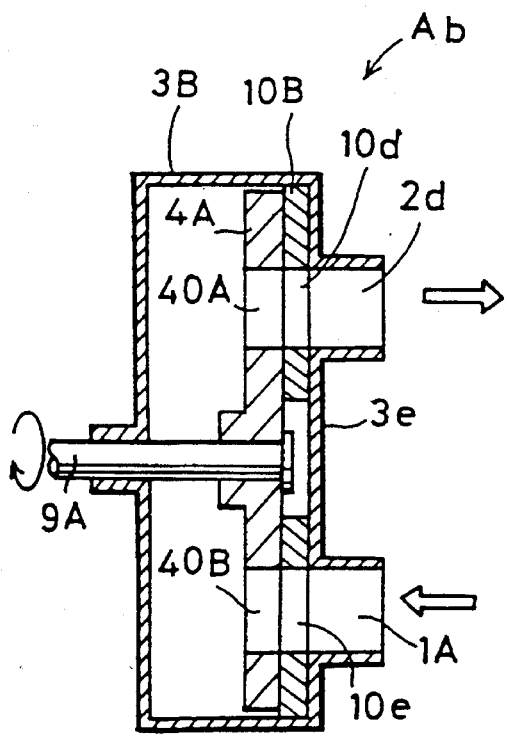
FIG. 13 is a sectional view showing a further embodiment of a pulsating air generator according to the present invention.

FIG. 13 is a sectional view of other embodiment applying a pulsating air generator Ab according to the present invention. Both a transmitting port 1A for a pulsating air and a connection port 2d for a blower are provided at one side wall 3e of a casing 3B of the generator Ab. A valve disk 4A which is rotated by an axis 9A is provided with two holes 40A, 40B for ventilation in such a manner that the holes simultaneously face the transmitting port 1A and the connecting port 2d respectively. Two holes 10d, 10e are provided for a spacer 10B which is interposed between the valve disk 4A and the side wall 3e.

Figure 14:
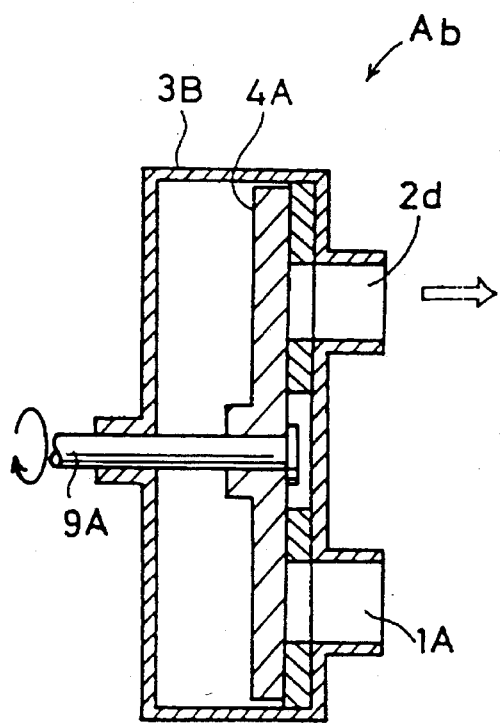
FIG. 14 is a sectional view showing one condition where the valve disk of the pulsating air generator shown in FIG. 13 is rotated.

According to the above-mentioned construction, when the valve disk 4A is rotated while the connecting port 2d is connected with the suction side or the feed side of the blower, both the connecting port 2d and the transmitting port 1A are opened and communicated in the casing 3B under the condition of FIG. 13, negative pressure or positive pressure being generated from the transmitting port 1A. On the other hand, in FIG. 14, the valve disk 4A blocks both the connecting port 2d and the transmitting port 1A simultaneously, and generation of negative pressure or positive pressure from the port 1A being stopped. Consequently, negative pressure or positive pressure is intermittently generated from the transmitting port 1A by continuously rotating the valve disk 4A and a pulsating air is transmitted.

Embodiments of a pulsating air generator vary according to the present intention and their constructions aren't limited to the above-mentioned embodiments. For example, the pulsating air generator Aa as shown in FIG. 8 is designed such that the connecting port 2c is opened and closed by the valve disk 4 while the transmitting port 1 is always opened. However, in the present invention, the connecting port 2c and the transmitting port 1 can be constructed reversely. That is, the transmitting port 1 is opened or closed by the valve disk 4 and the connecting port 2c is always opened. In such a case, the transmitting port 1 is operated as a connecting port for a blower by connecting the blower to the transmitting port 1 of the pulsating air generator Aa of FIG. 8. The connecting port 2c isn't connected with the blower and is operated as a transmitting port for a pulsating air. A spacer 10 as shown in FIG. 1 is preferably used when the valve disk 4 is attached, but the spacer isn't indispensable.

Figure 15:
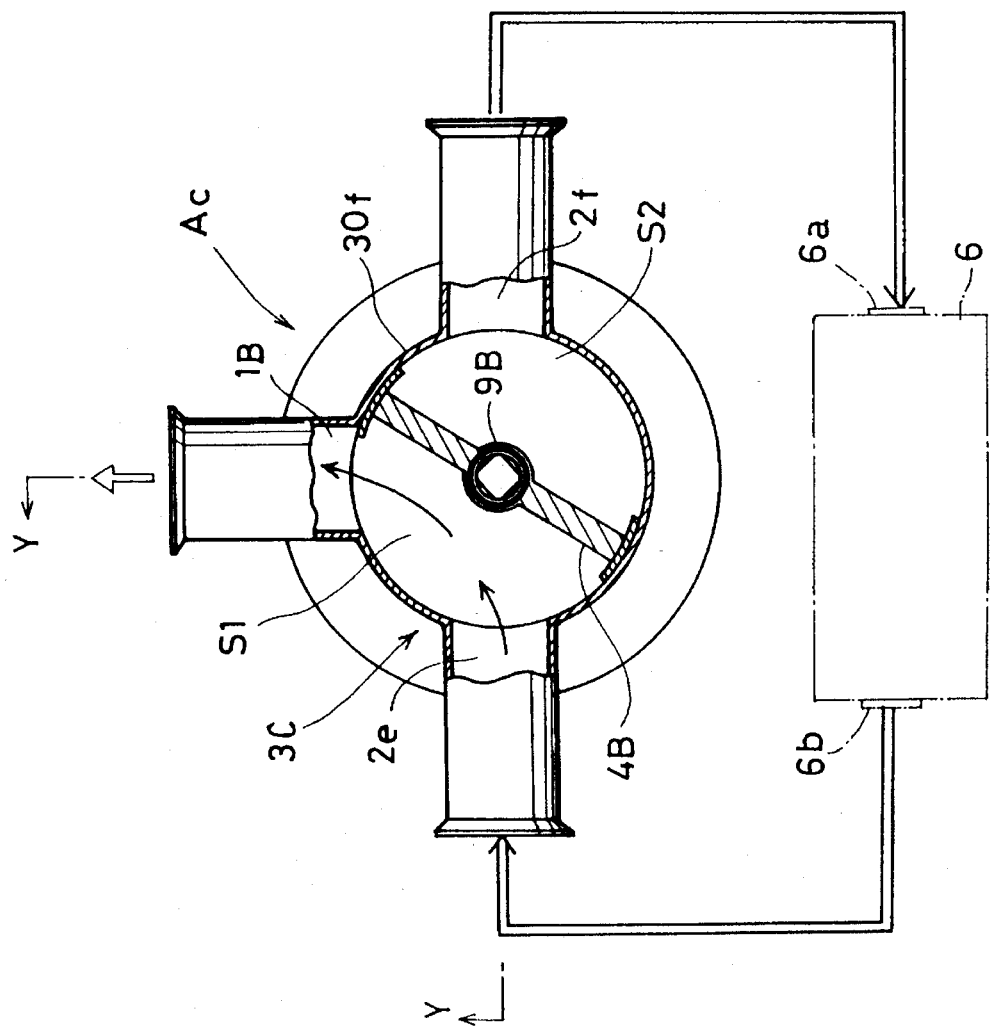
FIG. 15 is a sectional view of a further embodiment of a pulsating air generator according to the present invention.
Figure 16:
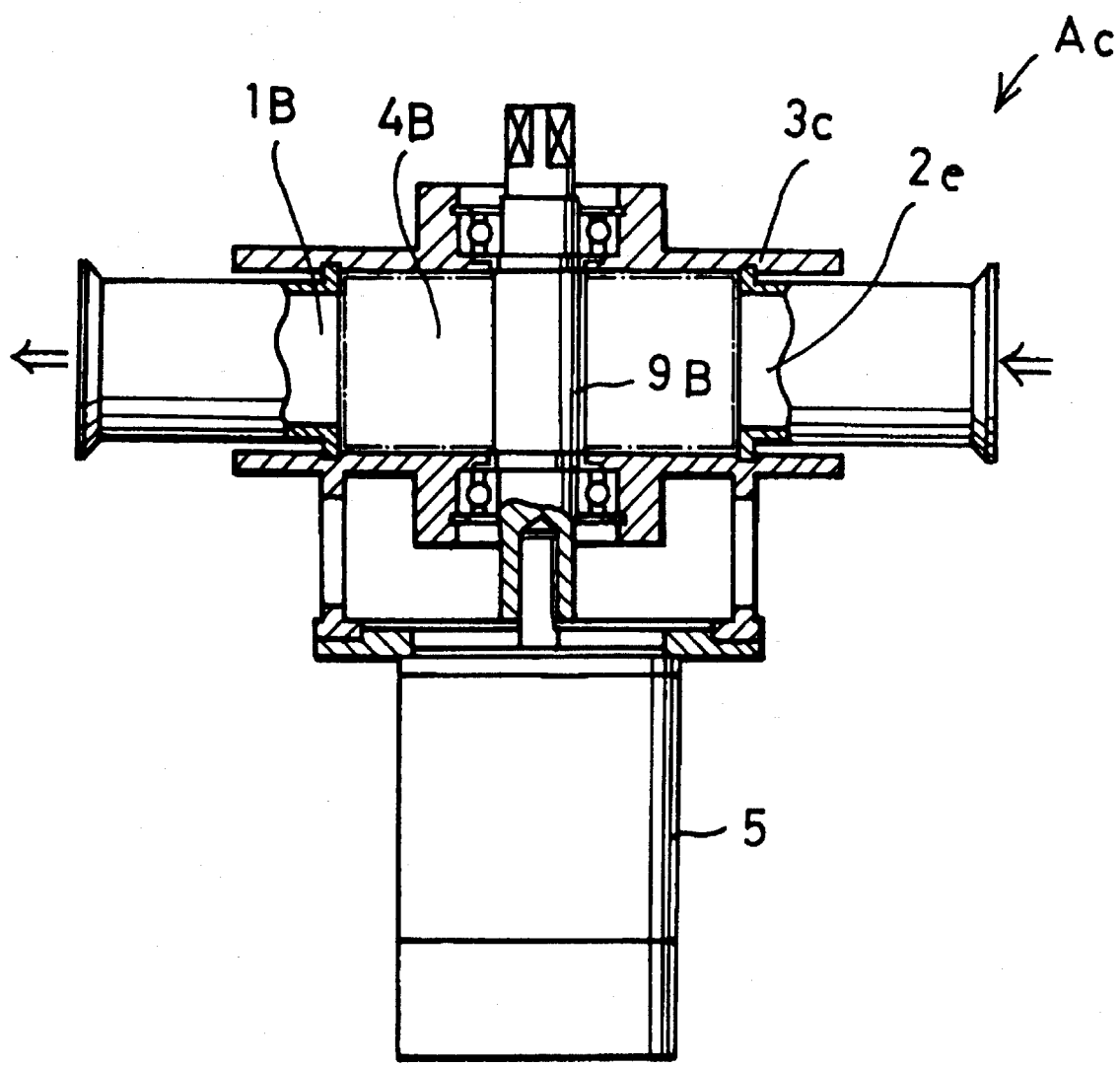
FIG. 16 is a sectional view taken along line Y—Y of FIG. 15.

FIG. 15 is a partial sectional view of the other embodiment of a pulsating air generator Ac according to the present invention. FIG. 16 is a sectional view taken along line Y—Y of FIG. 15. The pulsating air generator Ac is different from axial-flow type generators as described hereinbefore. A transmitting port for a pulsating air 1B and two connecting ports for a blower 2e, 2f are provided on a circumferential wall 30f of a casing 3C which is formed cylindrically. A valve plate 4B is constructed such that it is rotated in the casing 3C accompanied by the rotation of a revolving axis 9B connected with a driving motor 5 while keeping the casing 3C divided into two spaces S1, S2.

According to the above-mentioned generator Ac, when the valve plate 4B is continuously rotated in one direction under the condition that the connecting ports 2e, 2f are connected with a feeding port 6b and a suction port 6a of the blower 6 respectively, a pulsating air generated by positive pressure and negative pressure alternately can be appropriately transmitted from the transmitting port 1B.

The connecting port 2f and the transmitting port 1B are closed by the valve plate 4B and the connecting port 2e is communicated with the transmitting port 1B via the space S1 when the valve plate 4B is positioned as shown in FIG. 15. Accordingly, air with a fixed pressure supplied from the blower 6 is discharged from the transmitting port 1B. When the valve plate 4B is positioned as shown in FIG. 17, on the contrary, the connecting port 2f and the transmitting port 1B are communicated each other and the connecting port 2e and the transmitting port 1B aren't communicated. At this time negative pressure is generated at the transmitting port 1B by suction operation of the blower 6. Consequently, positive pressure and negative pressure are alternately generated at the transmitting port 1B when the valve plate 4B is continuously rotated, a pulsating air being appropriately generated.

Figure 18:
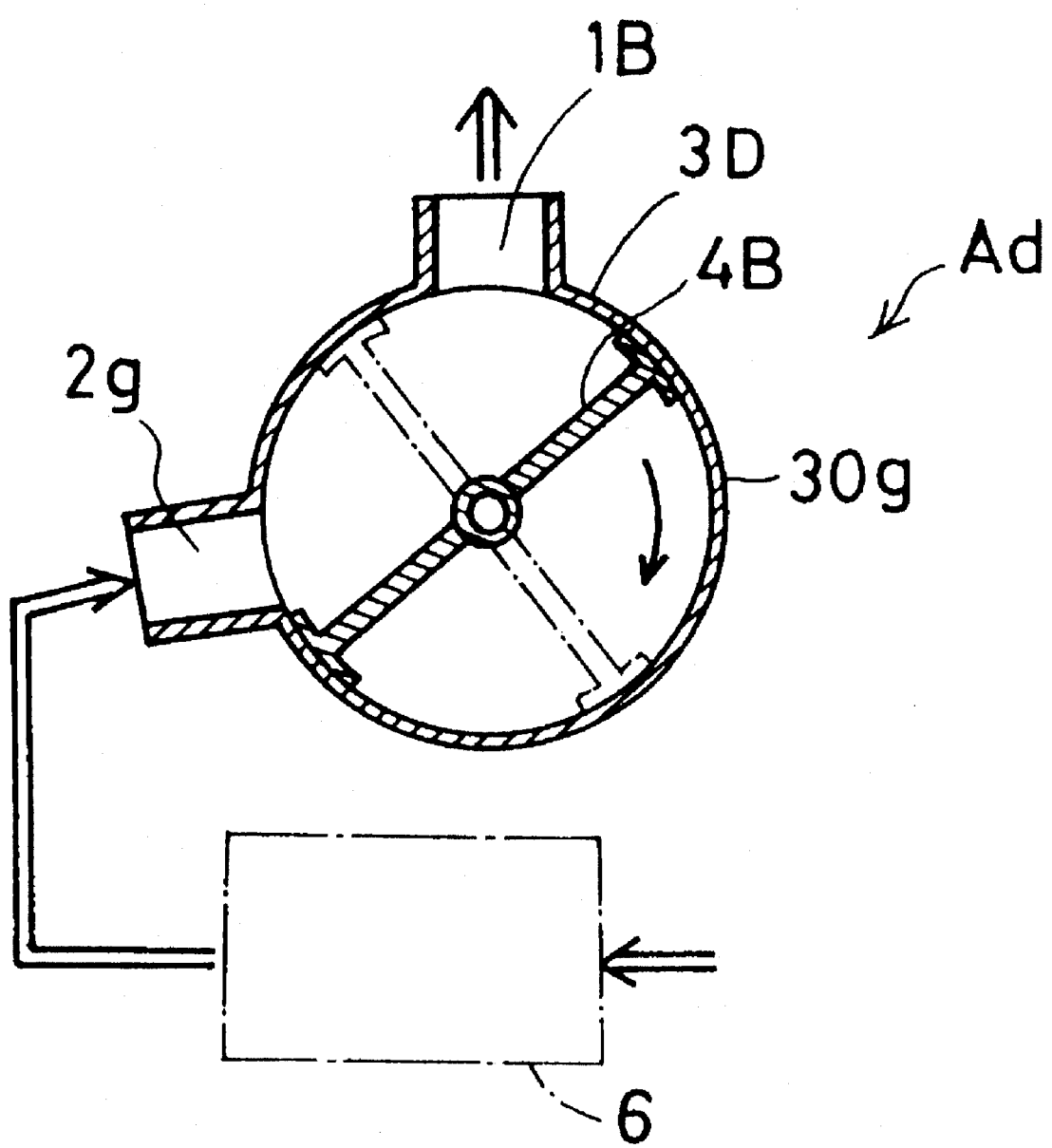
FIG. 18 is a sectional view of a further embodiment of a pulsating air generator according to the present invention.

FIG. 18 is a sectional view of a still other embodiment of a pulsating air generator Ad according to the present invention. The generator Ad is constructed such that a transmitting port for a pulsating air 1B and a connecting port for a blower 2g are provided at an outer wall 30g of a casing 3D. Other basic construction of the generator Ad is the same as the embodiment shown in FIG. 15.

According to such a construction, when the connecting port 2g is connected with a feeding side or a suction side of the blower 6 and the valve plate 4B is rotated, air with a fixed pressure is discharged or sucked from the transmitting port 1B while the valve plate 4B is positioned at the place which is shown by solid lines. When the valve plate 4B is positioned at the place shown by dotted lines, discharge or suction of air from the transmitting port 1 is stopped. A pulsating air with positive pressure or negative pressure can be generated by rotating the valve plate 4B continuously like the embodiments described in FIG. 8 and FIG. 9.

Figure 19:
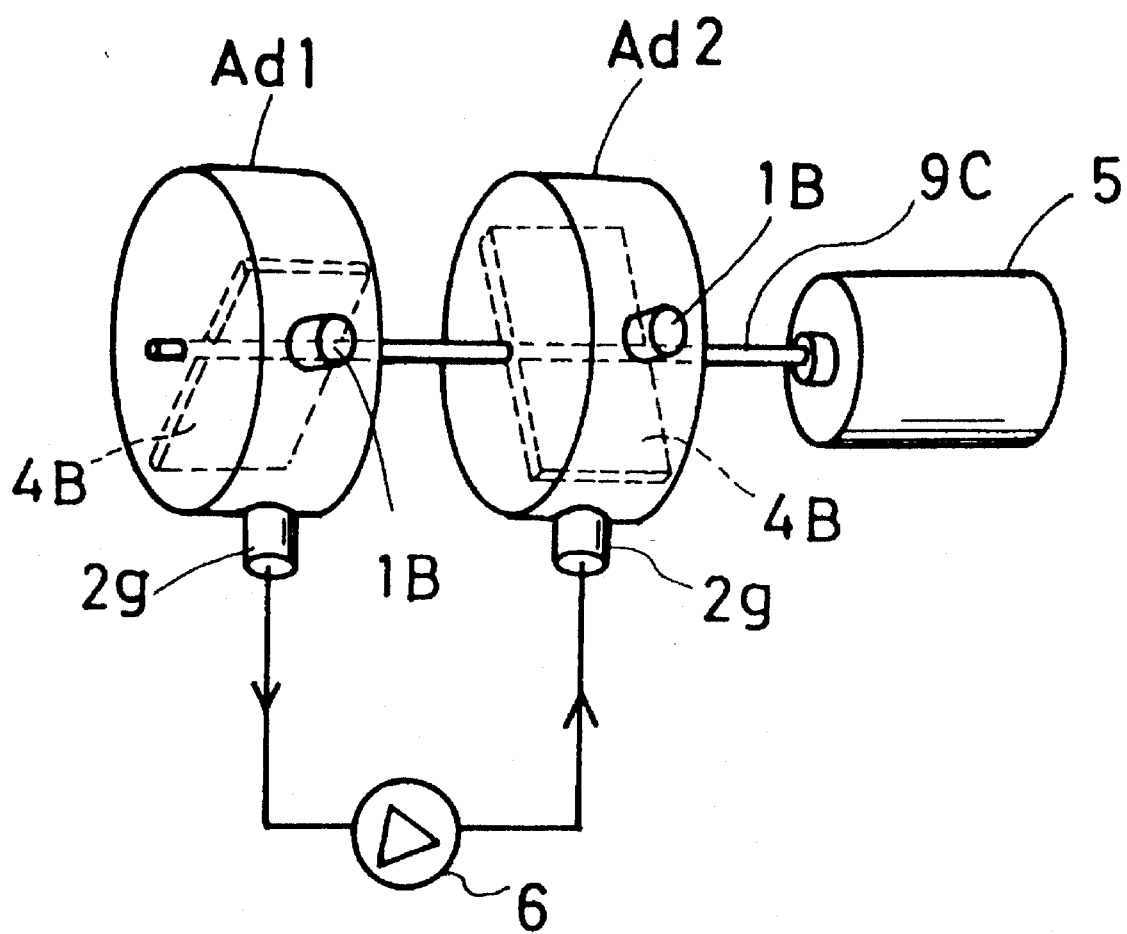
FIG. 19 is a perspective view showing one embodiment in which a pulsating air generator of the present invention is utilized.

In FIG. 19, each connecting port 2g, 2g of two rotary-type pulsating air generators Ad1, Ad2, the same one as shown in FIG. 18 is connected with a suction port and a discharge port of a blower 6. One rotary axis 9C is used to support valve plates 4B, 4B of two generators Ad1, Ad2 and is rotated by a driving motor 5. According to such a construction, a pulsating air can be separately generated from both generators Ad1, Ad2 by using one driving motor 5 and one blower 6. Such a construction has an advantage of accomplishing a simplified instrument.

When the rotation phase of the valve plate 4B of the generator Ad1 is the same as that of the valve plate 4B of the generator Ad2 as shown in FIG. 20, the generator Ad2 can transmit a pulsating air of positive pressure and simultaneously the generator Ad1 produces a pulsating air of negative pressure. On the other had, when the rotation phases of the valve plates 4B, 4B are different in the angle of 180 degrees, transmission of a pulsating air from the generator Ad2 can be stopped while a pulsating air of negative pressure is transmitted from the generator Ad1. Therefore, transmissions of a pulsating air from the generators Ad1, Ad2 can be alternated. Other types of generators such as shown in FIG. 1 and so on can be applied to such an construction that uses two pulsating air generators at the same time. Application of pulsating air generators isn't limited to the above-mentioned embodiments.

In the pulsating air generation apparatus of the present invention, a rotary valve disk isn't always used. The air passage which is extended from the connecting port to the transmitting port in the casing may be intermittently closed by reciprocating a valve plug. A small valve plug which is enough to block up one part of the air passage may be used as a valve plug in the present invention. Therefore, reciprocation of the valve plug doesn't cause the whole instrument a large mechanical vibration unlike the conventional instrument in which a large diaphragm is reciprocated to generate a pulsating air.

The following effects are apparent from the above-mentioned description according to the present invention.

According to the method for generating a pulsating air, a pulsating air can be generated from a transmitting port by intermittently communicating an air passage in a casing extending from a connecting port to the transmitting port by means of a valve while air is supplied into or discharged from the casing by a blower. Therefore, the oscillation pressure of a pulsating air can be easily made higher by heightening the suction pressure and discharge pressure of the blower without enlarging parts of the casing. As the result, a pulsating air at high oscillation pressure can be generated easily and appropriately and such a pulsating air can be applied for various industries, such as heating or drying powdered or granular materials. It is apparent that the pulsating air has unique characteristics and is widely used. Large parts, such as a diaphragm, which are mechanically reciprocated aren't required in order to produce a pulsating air. Therefore, mechanical vibration and noise aren't caused for instruments such as a casing and working condition can be made better.

According to a pulsating air generator of the present invention, the claimed generation method can be executed appropriately and usefully. The frequency of a pulsating air can be modified easily and randomly by changing the rotating speed of a valve. Further, a desired wave shape can be obtained by varying position, shape, size and so on of the openings of the transmitting port and the connecting ports. Comparing to the prior apparatus in which a part is reciprocated, the vibration of the apparatus can be more reduced because the valve is designed to be rotated in the casing.

According to other embodiment of the present invention, the apparatus is an axial flow type wherein a transmitting port and a connecting port are provided at a wall of the casing so as to face a front and back of a valve. When piping is executed for the connecting port and so on, the piping doesn't project out of the casing. Therefore, the whole apparatus can be made smaller.

According to other embodiment of the present invention, a pulsating air at large amplitude wherein pressurizing and depressurizing are repeated alternately. According to still other embodiment of the present invention, the pulsating air generator can be also used in continuous air suck and in continuous air feed other than in generating a pulsating air. Therefore, the apparatus has such advantage and convenience.

What is claimed is:

1. A method for generating a pulsating air, comprising the steps of:

drawing air into a casing or discharging air from the casing by driving a blower connected with a connecting port of the casing, simultaneously repeating opening and closing of an air passage intermittently by rotating a valve, said air passage extending from said connecting port for the blower to a transmitting port of said casing for transmitting a pulsating air; and supplying a pulsating air continuously from said transmitting port of said casing.

2. A method for generating a pulsating air as set forth in claim 1, wherein said pulsating air is one of the followings, a pulsating air comprising positive wave and negative wave, a pulsating air comprising negative wave, or a pulsating air comprising positive wave.

3. An apparatus for generating a pulsating air, comprising:

a casing provided with a connecting port for a blower and a transmitting port for a pulsating air, said connecting port for the blower being connected with a feeding side of the blower or a suction side of the blower; and a valve for closing up an air passage in said casing, said air passage extending from said connecting port for the blower to said transmitting port for a pulsating air, said valve being designed to be operated so as to intermittently communicate said air passage.

4. An apparatus for generating a pulsating air as set forth in claim 3, the apparatus is an axial-flow type, wherein:

said valve is a disk type;

said transmitting port for a pulsating air and said connecting port for the blower are provided at walls of said casing, said walls facing a front and a back of said valve disk respectively and said valve being designed so as to be rotated freely in said casing by the rotation of a rotating axis;

said valve disk is provided so as to face said transmitting port for a pulsating air and said connecting port for the blower in such a way that the front or the back of said valve disk can shut off at least one of said transmitting port and said connecting port; and said valve disk is further provided with holes for communication, the holes intermittently opening said transmitting port or said connecting port when said valve disk is rotated.

5. An axial flow-type apparatus for generating a pulsating air as set forth in claim 4, wherein:

said transmitting port for a pulsating air is provided at either said front wall or said back wall of said casing; and plural connecting ports for the blower are provided at the other side of the casing wall so as to be opened or closed alternately by said valve disk, said each of plural connecting ports being connected with a feeding side and a suction side of the blower.

6. An apparatus for generating a pulsating air as set forth in claim 3, the apparatus is a rotary type, wherein:

said valve is a plate type;

said valve is provided so as to be rotated freely in said casing by the rotation of a rotating axis, keeping an inside of said casing divided into plural spaces;

said transmitting port for a pulsating air and said connecting port for the blower are provided at an outer wall of said casing, said outer wall facing outer sides of said valve; and said transmitting port for a pulsating air and said connecting port are shut off and communicated alternately by said valve when said valve rotates.

7. A rotary-type apparatus for generating a pulsating air as set forth in claim 6, wherein:

plural connecting ports for the blower are provided at said outer wall of said casing, said connecting ports being connected with each of a feeding side and a suction side of the blower;

one of said plural connecting ports for the blower is alternately communicated with said transmitting port for a pulsating air, and the other connecting port for the blower is shut off from said transmitting port by said valve when said one of plural connecting ports is communicated with said transmitting port for a pulsating air.

8. An apparatus for generating a pulsating air as set forth in claim 3, 4, 5, 6 or 7, wherein:

said valve is provided so as to be stopped and kept at a position where said transmitting port for a pulsating air and said connecting port for the blower are communicated each other; and air is discharged or sucked continuously from said transmitting port for a pulsating air.

\* \* \* \* \*